(12) United States Patent
Son

(10) Patent No.: US 9,678,587 B2
(45) Date of Patent: *Jun. 13, 2017

(54) TERMINAL, CONTROLLING METHOD THEREOF AND RECORDABLE MEDIUM FOR THE SAME

(71) Applicant: LG ELECTRONICS INC., Seoul (KR)

(72) Inventor: Young Seob Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

This patent is subject to a terminal disclaimer.

(21) Appl. No.: 14/524,362

(22) Filed: Oct. 27, 2014

(65) Prior Publication Data

US 2015/0042593 A1 Feb. 12, 2015

Related U.S. Application Data

(63) Continuation of application No. 14/194,219, filed on Feb. 28, 2014, now Pat. No. 8,907,916, which is a continuation of application No. 13/865,137, filed on Apr. 17, 2013, now Pat. No. 8,704,794, which is a
(Continued)

(30) Foreign Application Priority Data

Sep. 3, 2008 (KR) .................. 10-2008-0086696

(51) Int. Cl.
*G06F 3/041* (2006.01)
*G06F 3/0485* (2013.01)
*G11B 19/02* (2006.01)
*G11B 27/10* (2006.01)
*G11B 27/34* (2006.01)
*G06F 3/0488* (2013.01)
*G06F 3/0482* (2013.01)

(52) U.S. Cl.
CPC ............ *G06F 3/041* (2013.01); *G06F 3/0416* (2013.01); *G06F 3/0482* (2013.01); *G06F 3/0485* (2013.01); *G06F 3/0488* (2013.01); *G11B 19/025* (2013.01); *G11B 27/105* (2013.01); *G11B 27/34* (2013.01)

(58) Field of Classification Search
None
See application file for complete search history.

(56) References Cited

U.S. PATENT DOCUMENTS

| 5,513,306 A | 4/1996 | Mills et al. |
| 6,452,615 B1 | 9/2002 | Chiu et al. |
| 8,441,451 B2 | 5/2013 | Son |

(Continued)

FOREIGN PATENT DOCUMENTS

| EP | 1669998 | 6/2006 |
| EP | 1811522 | 7/2007 |

(Continued)

OTHER PUBLICATIONS

European Patent Office Application Serial No. 10015633.0, Office Action dated Jan. 19, 2017, 8 pages.

*Primary Examiner* — Adam R Giesy
(74) *Attorney, Agent, or Firm* — Lee Hong Degerman Kang & Waimey

(57) ABSTRACT

A mobile terminal is provided including a touchscreen and a controller. The controller is configured to display, on the touchscreen, a moving picture and a subset of a plurality of key frame pictures for the moving picture.

29 Claims, 27 Drawing Sheets

Related U.S. Application Data continuation of application No. 12/419,993, filed on Apr. 7, 2009, now Pat. No. 8,441,451.

(56) References Cited

U.S. PATENT DOCUMENTS

| | | |
|---|---|---|
| 8,704,794 B2 | 4/2014 | Son |
| 2002/0069218 A1 | 6/2002 | Sull et al. |
| 2004/0221322 A1 | 11/2004 | Shen et al. |
| 2005/0033758 A1 | 2/2005 | Baxter |
| 2008/0144890 A1 | 6/2008 | Ogawa |
| 2010/0017732 A1 | 1/2010 | Matsushima et al. |

FOREIGN PATENT DOCUMENTS

| | | |
|---|---|---|
| EP | 1818937 | 8/2007 |
| EP | 1830361 | 9/2007 |
| EP | 1942401 | 7/2008 |
| KR | 10-2000-0064909 | 11/2000 |
| KR | 10-2006-0063239 | 6/2006 |
| WO | 9834182 | 8/1998 |
| WO | 02084667 | 10/2002 |
| WO | 2008030976 | 3/2008 |
| WO | 2009032478 | 3/2009 |

(6-1)

(6-2)

(8-1)

(8-2)

(8-3)

(9-1)

(9-2)

(10-1)

(10-2)

(11-1)

(11-2)

(12-1)

(12-2)

(13-1)

(13-2)

(15-1)

(15-2)

(16-1)

(16-2)

(17-1)

(17-2)

(18-1)

(18-2)

(19-1)

(19-2)

(21-1)

(21-2)

(23-1)

(23-2)

(25-1)

(25-2)

TERMINAL, CONTROLLING METHOD THEREOF AND RECORDABLE MEDIUM FOR THE SAME

CROSS-REFERENCE TO RELATED APPLICATIONS

This application is a continuation of U.S. application Ser. No. 14/194,219, filed on Feb. 28, 2014, now U.S. Pat. No. 8,907,916, which is a Continuation of U.S. application Ser. No. 13/865,137, filed on Apr. 17, 2013, now U.S. Pat. No. 8,704,794, which is a continuation of U.S. application Ser. No. 12/419,993, filed Apr. 7, 2009, now U.S. Pat. No. 8,441,451, which, pursuant to 35 U.S.C. §119(a), claims the benefit of earlier filing date and right of priority to Korean Application No. 10-2008-0086696, filed on Sep. 3, 2008, the contents of all which are incorporated by reference herein in their entireties.

FIELD OF THE INVENTION

The present invention relates to a terminal, and more particularly, to a terminal and controlling method thereof.

DESCRIPTION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to whether the terminal is mobile. The mobile terminals can be further classified into handheld terminals and vehicle mount terminals according to whether the mobile terminal can be held in a user's hand or mounted in a vehicle.

There are ongoing efforts to support and increase the functionality of mobile terminals. Such efforts include software and hardware improvements, as well as changes and improvements in the structural components which form the mobile terminal.

Recently, a terminal user may not only view a moving picture displayed on a terminal from the beginning to the end but also may search and view a specific part of the moving picture. Therefore, there is a need for facilitating a terminal user to find and view a specific part of a moving picture.

SUMMARY OF THE INVENTION

In an exemplary embodiment of the present invention, a mobile terminal is provided including a touchscreen and a controller. The controller is configured to display, on the touchscreen, a moving picture and a subset of a plurality of key frame pictures for the moving picture.

In one embodiment, the displayed subset of key frame pictures correspond to a vicinity in time of a current play view of the moving picture.

In one embodiment, the controller is configured to move the displayed subset of key frame pictures when one of the displayed subset of key frame pictures is touched with a pointer and dragged in one direction.

In one embodiment, the controller is configured to remove at least one of the displayed key frame pictures by sliding out of the touchscreen and to add at least one of non-displayed key frame pictures of the plurality of key frame pictures by sliding into the touchscreen when one of the displayed subset of key frame pictures is moved.

In one embodiment, the controller is configured to display a scroll bar on the touchscreen to adjust the current play view of the moving picture, and to display the subset of key frame pictures when the scroll bar is manipulated.

In one embodiment, the controller is configured to display the subset of key frame pictures when the displayed moving picture is touched.

In one embodiment, after a playback of the moving picture is paused, the controller is configured to transform a paused frame of the displayed moving picture into one of the key frame pictures that appear by sliding into the touchscreen when one of the displayed subset of key frame pictures is touched with a pointer and dragged in one direction.

In one embodiment, the controller is configured to display at least one of the displayed subset of key frame pictures as enlarged.

In one embodiment, the controller is configured to display at least one of the moved subset of key frame pictures as enlarged.

In one embodiment, the controller is configured to generate and to display at least one corresponding sub-key frame picture between two adjacent key frame pictures among the displayed subset of key frame pictures.

In one embodiment, the controller is configured to display the at least one corresponding sub-key frame picture when a space between the two adjacent key frame pictures is touched.

In one embodiment, the controller is configured to generate and to display the at least one corresponding sub-key frame picture between the two adjacent key frame pictures only.

In one embodiment, the controller is configured to generate at least one additional corresponding sub-key frame picture between the displayed subset of key frame pictures when the at least one corresponding sub-key frame picture is generated.

In one embodiment, the mobile terminal includes a gyro-sensor. The controller is configured to move the displayed subset of key frame pictures by sliding when the mobile terminal is slanted by causing the displayed subset of key frames to shift in a direction of the slant.

In one embodiment, the touchscreen is divided into a played picture area for displaying the moving picture and a key frame picture area for displaying the subset of key frame pictures.

In one embodiment, the played picture area and the key frame picture area are configured to at least partially overlap.

In one embodiment, the controller is configured to create a new key frame picture from a frame of the displayed moving picture.

In one embodiment, the controller is configured to create the new key frame picture from the frame of the displayed moving picture when the played picture area is touched and dragged to the key frame picture area.

In one embodiment, the controller is configured to readjust a time interval between the displayed subset of key frame pictures according to a time interval between the new key frame picture and one of the displayed subset of key frame pictures closest in time to the new key frame picture when the new key frame picture is created.

In one embodiment, the controller is configured to adjust a time interval between the displayed subset of key frame pictures.

In one embodiment, the controller is configured to adjust the time interval if two adjacent displayed key frame pictures are simultaneously touched and then dragged closer to each other or farther from each other.

In an exemplary embodiment of the present invention, a method of controlling a mobile terminal is provided. A moving picture is displayed on a touchscreen. A subset of a plurality of key frame pictures for the moving picture is displayed on the touchscreen.

In an exemplary embodiment of the present invention, a user terminal is provided including a touchscreen, a memory unit, and a controller. The memory unit is configured to store at least a portion of a moving picture and a plurality of key frame pictures. The plurality of key frame pictures include selected frames from the moving picture spaced apart in time. The controller is configured to display, on the touchscreen, the moving picture and a subset of the plurality of key frame pictures.

DETAILED DESCRIPTION

Reference will now be made in detail to the exemplary embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes "module," "unit," and "part" are used for elements in order to facilitate the disclosure only. Therefore, significant meanings or roles are not given to the suffixes themselves and it is understood that the expressions "module," "unit," and "part" can be used together or interchangeably.

The present invention can be applicable to various types of terminals. Examples of such terminals include mobile as well as stationary terminals, such as mobile phones, user equipment, smart phones, digital television (DTV), computers, digital broadcast terminals, personal digital assistants, portable multimedia players (PMP), and navigators.

However, by way of non-limiting example only, further description will be with regard to a mobile terminal 100, and it should be noted that such teachings may apply equally to other types of terminals.

Figure 1:
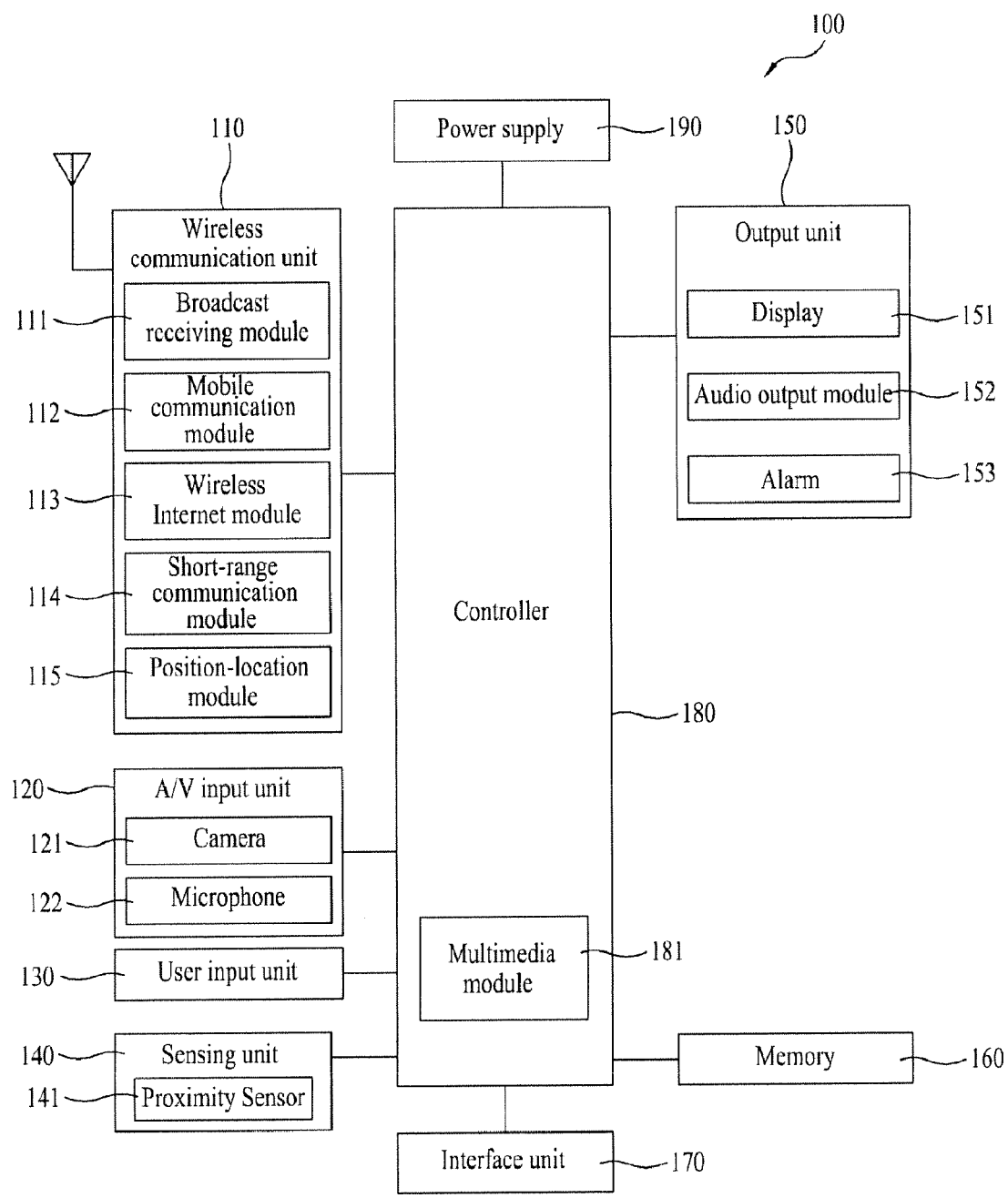
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 with various components, but it is understood that implementing all of the illustrated components is not a requirement, as greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. For non-mobile terminals, the wireless communication unit 110 can be replaced with a wired communication unit. The wireless communication unit 110 and wired communication unit can be commonly referred to as a communication unit. A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided in the mobile terminal 100 to obtain simultaneous reception of at least two broadcast channels or facilitation of broadcast channel switching.

Examples of broadcast associated information include information associated with a broadcast channel, a broadcast program, and a broadcast service provider. For example, the broadcast associated information may include an electronic program guide (EPG) of digital multimedia broadcasting (DMB), and an electronic service guide (ESG) of digital video broadcast-handheld (DVB-H).

The broadcast signal may be implemented, for example, as a TV broadcast signal, a radio broadcast signal, or a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless Internet module 113 supports Internet access for the mobile terminal 100. This module may be internally or externally coupled to the mobile terminal 100. Suitable technologies for wireless Internet may include, but are not limited to, WLAN (Wireless LAN) (Wi-Fi), WiBro (Wireless broadband), WiMAX (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth® and ZigBee™.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude, and altitude by calculating distance information and precise time information from at least three satellites and then applying triangulation to the calculated information. Currently, location and time information is calculated using three satellites, and errors of the calculated location position and time information are then amended using another satellite. The GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as a phone call mode, a recording mode, or a voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel, and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation (or inclination) or acceleration/deceleration of the mobile terminal. The sensing unit 140 can include a terrestrial magnetic sensor and/or a gyro-sensor.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or a removable user identity module (RUIM) card.

When the mobile terminal 110 is connected to an external cradle, the interface unit 170 becomes a passage for supplying the mobile terminal 100 with power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The output unit 150 includes various components that support the output requirements of the mobile terminal 100. A display 151 visually displays information associated with the mobile terminal 100. For example, if the mobile terminal 100 is operating in a phone call mode, the display provides a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function as both an output device and an input device.

The display 151 may be implemented using known display technologies including a liquid crystal display (LCD), a thin film transistor-liquid crystal display (TFT-LCD), an organic light-emitting diode display (OLED), a flexible display, and a three-dimensional display.

Some of the displays may be configured to be transparent. A transparent LCD display is a representative example for the transparent displays.

The mobile terminal 100 may include one or more of displays 151. An example of a two-display embodiment is one in which one display 151 is configured as an internal display viewable when the terminal is in an opened position and a second display 151 is configured as an external display viewable in both the open and closed positions.

The touchscreen can be configured to detect a touch input pressure as well as a touch input position and size. A proximity sensor 141 can be provided within or around the touchscreen. The proximity sensor detects an object approaching a prescribed detecting surface or a presence or non-presence of an object existing around the sensor using electromagnetic power or infrared rays without mechanical contact. Hence, the proximity sensor is superior to a contact sensor in lifespan and utilization.

An explanation of an operational principle of the proximity sensor follows. If an object approaches a sensor detecting surface while an oscillation circuit oscillates a sinusoidal radio frequency, an oscillation amplitude of the oscillation circuit attenuates or stops. This change is converted to an electric signal to detect a presence or non-presence of the object. So, even if any non-metallic material comes between the RF oscillation proximity sensor and the object, a proximity switch is able to detect the object to detect without interference with the material.

Even without the proximity sensor, if the touchscreen is electrostatic, the touchscreen can be configured to detect the proximity of a pointer through an electric field change attributed to the proximity of the pointer.

Consequently, if the pointer is placed in the vicinity of the touchscreen without actually contacting the touchscreen, the touchscreen is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. A position at which the proximity touch is made to the touchscreen using the pointer is a position of the pointer vertically corresponding to the touchscreen when the pointer makes the proximity touch.

If the proximity sensor is used, the sensor is able to sense a proximity touch and its pattern (e.g., proximity touch distance, proximity touch direction, proximity touch speed, proximity touch position, and proximity touch moving state). The sensor is also able to output information corresponding to the sensed proximity touch action and the proximity touch pattern to the touchscreen.

FIG. 1 further shows the output unit 150 with an audio output module 152, which supports the audio output requirements of the mobile terminal 100. The audio output module 152 is implemented using one or more speakers, buzzers, other audio producing devices, and combinations thereof.

The audio output module 152 functions in various modes such as a call-receiving mode, a call-placing mode, a recording mode, a voice recognition mode, and a broadcast reception mode. During operation, the audio output module 152 outputs audio relating to a particular function or status, such as call received, message received, or errors.

The output unit 150 is shown with an alarm 153, which is commonly used to signal or otherwise identify the occurrence of a particular event associated with the mobile terminal 100. Typical events include call received, message received, and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

In the memory 160, use frequencies (e.g., a use frequency for each phone number, each message, and each multimedia) of the data can be stored together. Moreover, data for various patterns of vibration and/or sound outputted in case of a touch input to the touchscreen can be stored in the memory 160. In addition, map information can be stored in the memory 160, which increases a user's convenience, as the map information can be provided to a user when necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 controls the overall operations of the mobile terminal 100. For example, the controller 180 performs the control and processing associated with voice calls, data communications, instant message communication, video calls, camera operations, and recording operations.

The controller 180 may include a multimedia module 181 that provides multimedia (such as moving picture, still picture, and audio) playback. The multimedia module 181 may be configured as part of the controller 180, or implemented as a separate component. The controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type, and combinations thereof. Further disclosure will primarily relate to a slide-type mobile terminal 100. However such teachings apply equally to other types of mobile terminals.

Figure 2:
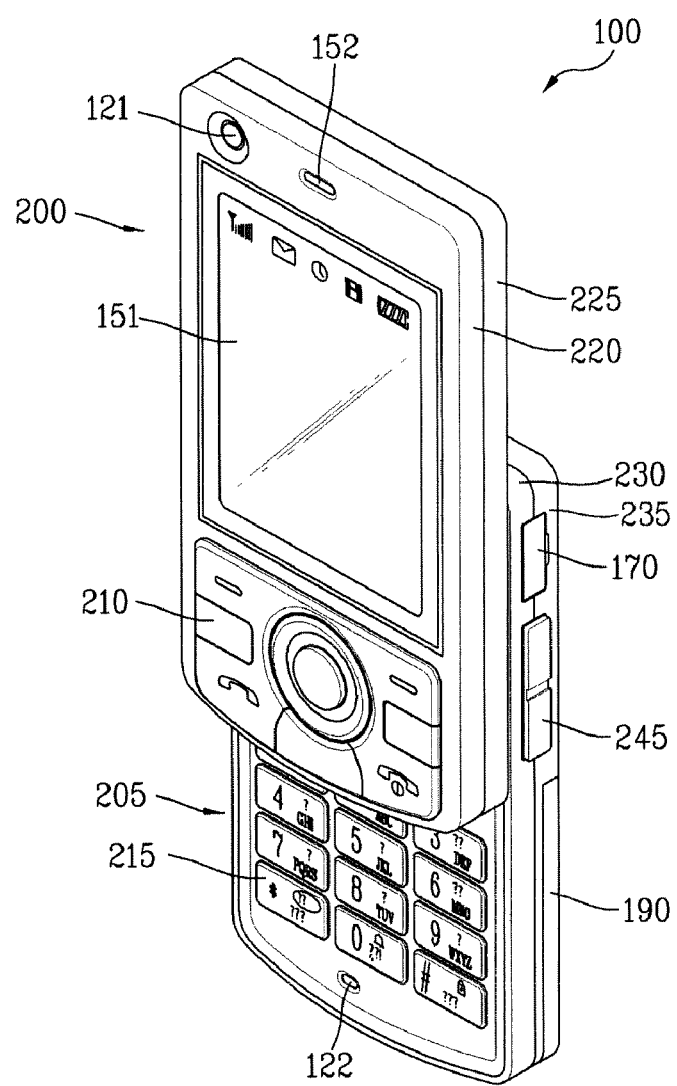
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown with a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop, and scroll.

The mobile terminal 100 is operable in either a standby mode, in which it is able to receive a call or message and to receive and respond to network control signaling, or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are sized to receive electronic components necessary to support operation of the mobile terminal 100.

The first body 200 is shown with a camera 121 and audio output unit 152, which is configured as a speaker, positioned relative to the display 151. The camera 121 may be constructed such that it can be selectively positioned relative to first body 200 such as by rotation or swiveling.

The function keys 210 are positioned adjacent to a lower side of the display 151, which is shown implemented as an LCD or OLED. The display may also be configured as a touch screen with an underlying touchpad which generates signals responsive to user contact with the touchscreen, such as with a finger or stylus.

The second body 205 is shown with a microphone 122 positioned adjacent to the keypad 215 and with side keys 245, which are one type of a user input unit as mentioned above, positioned along the side of second body 205. In an exemplary embodiment, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
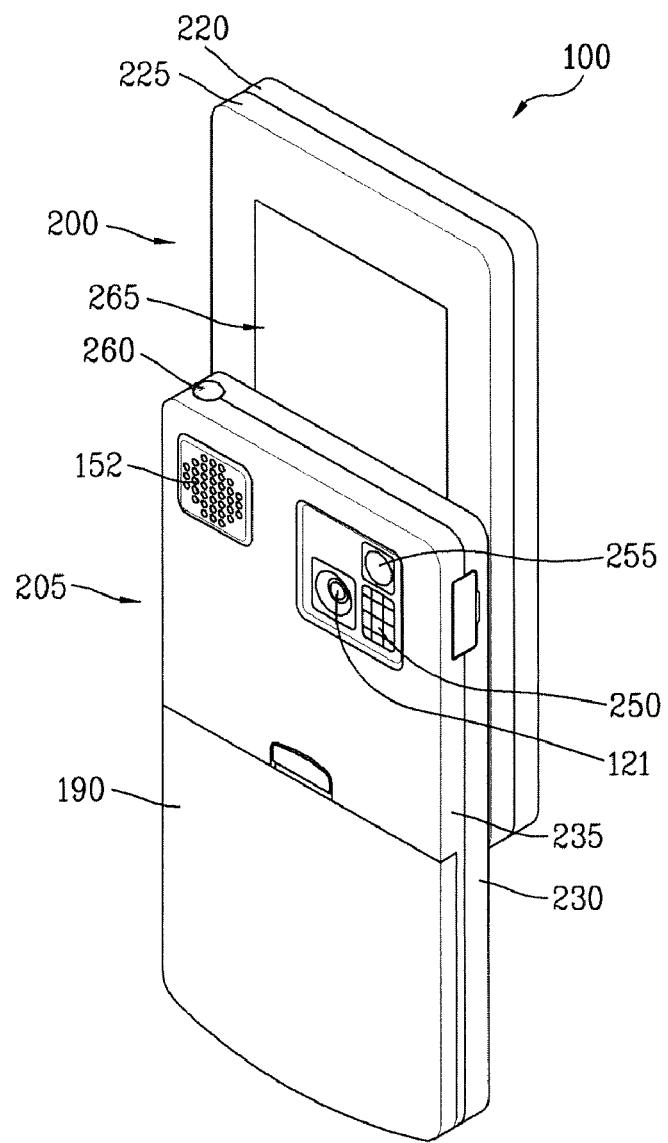
FIG. 3 is a perspective diagram of a backside of the mobile terminal shown in FIG. 2.

FIG. 3 is a rear view of the mobile terminal 100 shown in FIG. 2. FIG. 3 shows the second body 205 with a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
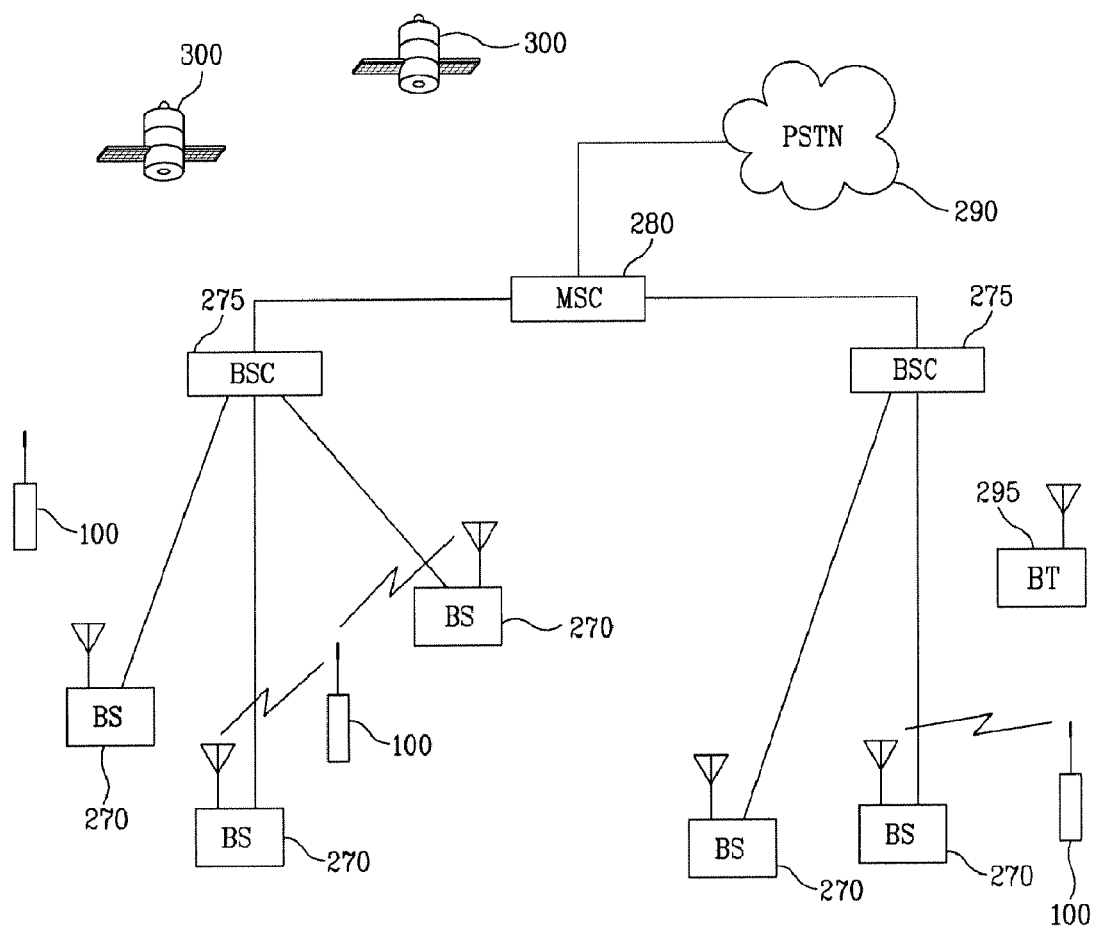
FIG. 4 is a block diagram of a wireless communication system in which a mobile terminal according to the present invention is operable.

Referring to FIG. 4, a CDMA wireless communication system is shown with a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector with an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

Figure 5:
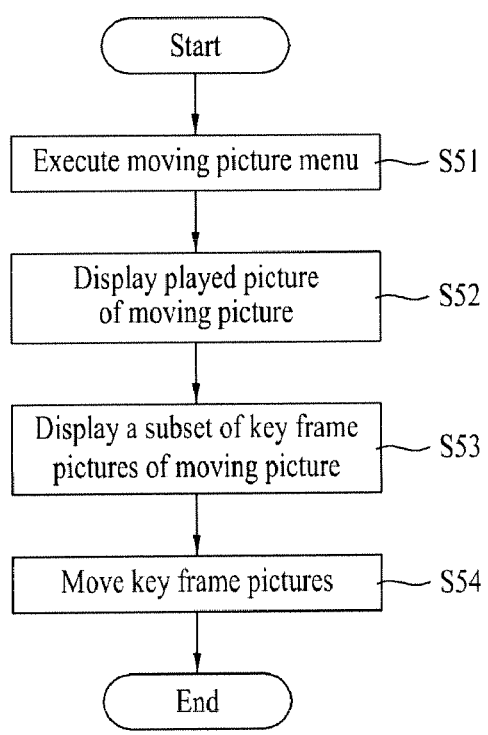
FIG. 5 is a flowchart for a method of controlling a mobile terminal according to a first embodiment of the present invention.
Figure 6:
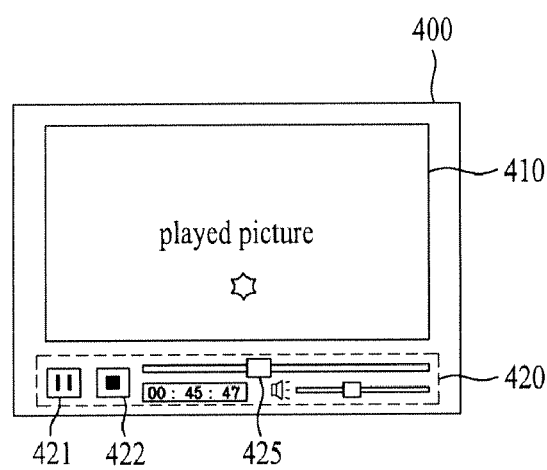
FIG. 6 is a diagram of a display screen on which a method of controlling a mobile terminal according to the first embodiment of the present invention is implemented.
Figure 6:
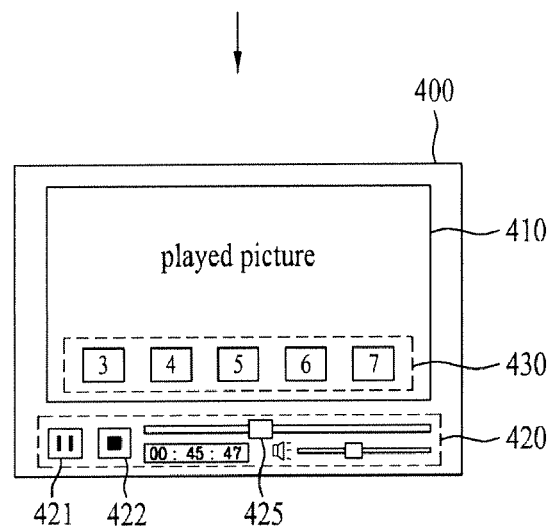

The following embodiments can be implemented more easily if the display module 151 includes a touchscreen 400 (FIG. 6). In the following description, a method of controlling a mobile terminal according to a first embodiment of the present invention is explained with reference to FIGS. 5 to 12.

Figure 7:
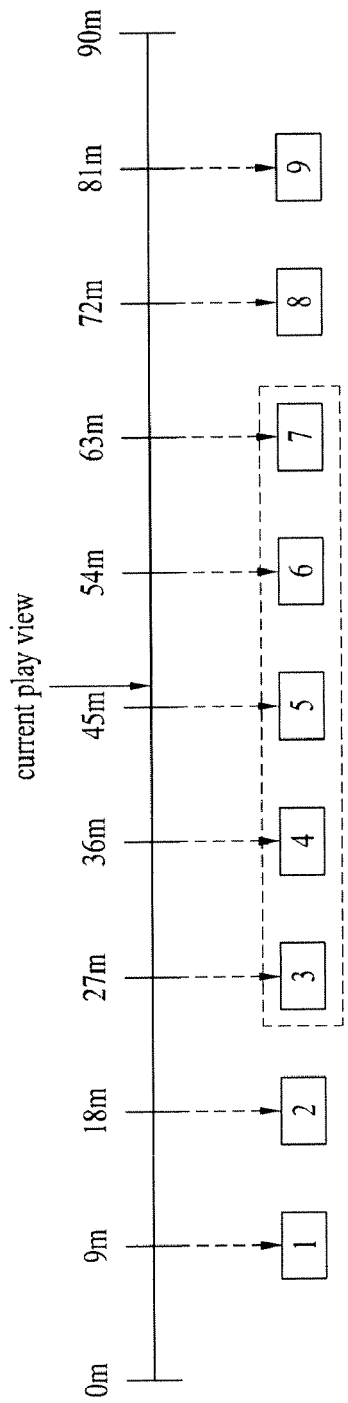
FIG. 7 is a configurational diagram of a key frame for a moving picture described in FIG. 6.

FIG. 5 is a flowchart for a method of controlling a mobile terminal according to a first embodiment of the present invention. FIG. 6 is a diagram of a display screen on which a method of controlling a mobile terminal according to the first embodiment of the present invention is implemented, and FIG. 7 is a configurational diagram of a key frame for a moving picture described in FIG. 6.

Referring to FIG. 5 and (6-1) of FIG. 6, a moving picture menu is being executed in the mobile terminal 100 [S51]. Hence, a played picture of the moving picture is displayed on the touchscreen 400 [S52]. The moving picture may be stored in the memory 160, or can be received from an external server via the wireless communication unit 110.

The touchscreen 400 includes a played picture area 410 and a control area 420 for controlling a playback of the moving picture. Icons 421 and 422 for play start, stop, and pause are displayed in the control area 420. A scroll bar 425 for controlling a moving picture play point is also displayed in the control area 420. Manipulations of the icons 421 and 425 are apparent to those skilled in the art, whereby their details will be omitted in the following description for clarity of this disclosure.

As depicted in (6-1), a touch (e.g., a proximity touch or a contact touch) is performed on the played picture area 410. Referring to (6-2) of FIG. 6, a plurality of key frame (KF) pictures for the moving picture are displayed on the touchscreen 400 ((6-2) of FIG. 6; S53 of FIG. 5). In the touchscreen 400, there is a key frame picture region 430 on which the key frame pictures are displayed. The key frame picture region 430, as shown in (6-2) of FIG. 6, can be overlapped with the played picture area 410 in part or can be configured to be separated from the played picture area 410.

It is not mandatory for the key frame pictures to be configured in a manner of being displayed by touching the played picture area 410. For instance, the mobile terminal 100 is able to configure the key frame pictures to be displayed when the scroll bar 425 is manipulated. In addition, the mobile terminal 100 is able to configure the key frame pictures to be displayed through an appropriate key manipulation of the user input unit 130. The key frame pictures are explained in detail with reference to FIG. 7 as follows.

FIG. 7 is a configurational diagram of a key frame for the moving picture described in FIG. 6. Referring to FIG. 7, a whole time length of the moving picture is substantially equally divided by a prescribed number. A frame picture of the moving picture corresponding to each equally-divided timing point becomes a key frame picture of the moving picture. It is not necessary to divide the whole time length of the moving picture by a unit smaller than a second. A level enabling a terminal user to recognize the equal division of the time length of the moving picture at a glance is acceptable. In this case, the prescribed number is preset in the mobile terminal or may be set up by a terminal user in advance.

In FIG. 7, exemplarily shown is a case in which nine key frame pictures 1 to 9 (herein referred to as KF1 to KF9) exist for the moving picture. It is not necessary for the nine key frame pictures to be simultaneously displayed on the touchscreen. For instance, a subset KF3 to KF7 of the nine key frame pictures, as shown in (6-2) of FIG. 6, can be displayed on the touchscreen. When the key frame pictures are ordered to be displayed in the mobile terminal 100 (e.g., when the played picture area is touched as mentioned in the foregoing description), the displayed key frame pictures KF3 to KF7 can be configured to include the key frame picture KF5 nearest to a current play timing point of the moving picture among the key frame pictures KF1 to KF9.

Figure 8:
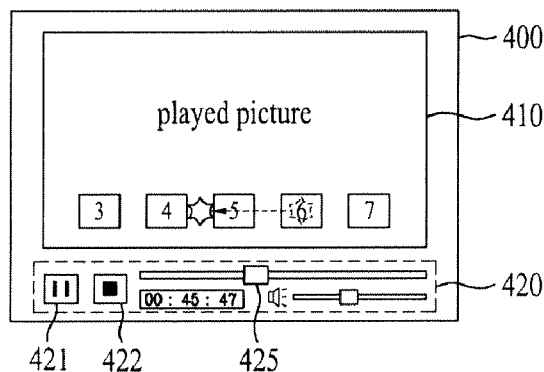
FIGS. 8 to 12 are diagrams of a display screen on which a method of controlling a mobile terminal according to the first embodiment of the present invention is implemented.
Figure 8:
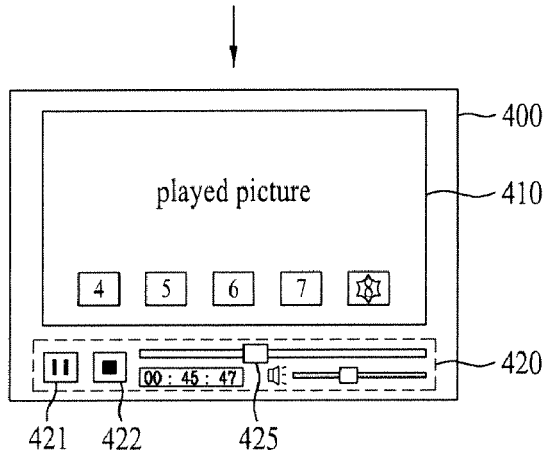
Figure 8:
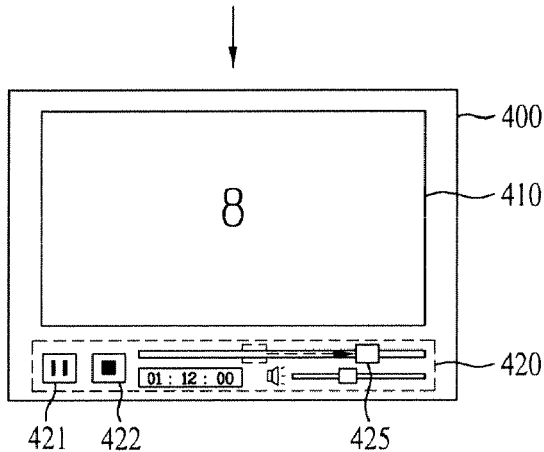

In the following description, a scheme for viewing the non-displayed key frame pictures is further explained with reference to FIG. 8. FIG. 8 is a diagram of a display screen on which a method of controlling a mobile terminal according to the first embodiment of the present invention is implemented. Referring to (8-1) of FIG. 8 and FIG. 5, a played picture at a current view of a moving picture and key frames KF3 to KF7 of the moving picture are displayed on the touchscreen 400 [S53]. As depicted, one of the displayed key frames is randomly touched and dragged right to left by a pointer (e.g., finger, stylus pen).

Referring to (8-2) of FIG. 8, the key frame pictures are moved overall by sliding right to left [S54]. Hence, the key frame picture KF3 among the displayed key frame pictures shown in (8-1) of FIG. 8 disappears by sliding out the left of the display. KF8 of the non-displayed key frame pictures KF1, KF2, KF8, and KF9, which are not displayed in (8-1) of FIG. 8, appears by sliding in from the right of the display.

It is not necessary to configure one of the key frame pictures to disappear or appear by sliding each time the touch & drag is performed on the touchscreen. The mobile terminal is able to configure at least two key frame pictures to disappear or appear by sliding in proportion to a length of the drag when the touch & drag is performed.

As depicted in (8-2), KF8 of the displayed key frame pictures KF4 to KF8 is selected by being touched and then released from the touch. Referring to (8-3) of FIG. 8, the key frame pictures KF4 to KF8 then disappear from the touchscreen 400, the selected key frame picture KF8 is displayed on the played picture area 410, and the scroll bar 425 is shifted to correspond to a play view of the selected key frame picture. In particular, the play view of the moving picture is shifted to the play view of the key frame picture.

In FIG. 8, the key frame pictures slide to move when one of the key frames is touched and dragged. Yet, such a configuration that one of the key frame pictures is touched and dragged is not mandatory for key frame pictures to slide to move. Alternatively, for example, the key frame pictures can slide to move when touch & drag is performed on any portion of the key frame picture area 430. Alternatively, even when the touchscreen is not touched and dragged, the mobile terminal is able to configure the key frame pictures to slide to move through a suitable key manipulation of the user input unit. This is apparent to those skilled in the art without separate description and its details will be omitted in the following description for clarity of this disclosure.

In the following description, various aspects in displaying the key frame pictures are explained with reference to FIGS. 9 to 12. FIGS. 9 to 12 are diagrams of a display screen on which a method of controlling a mobile terminal according to the first embodiment of the present invention is implemented.

Figure 9:
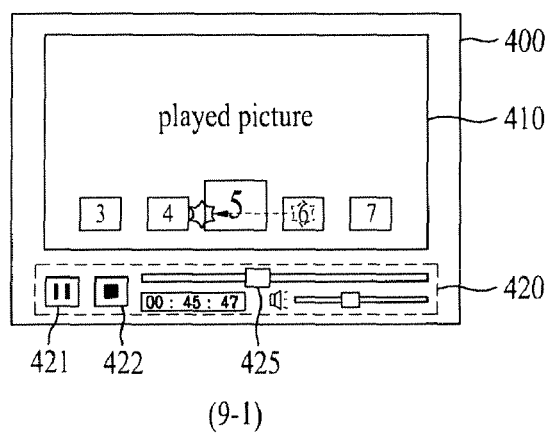
Figure 9:
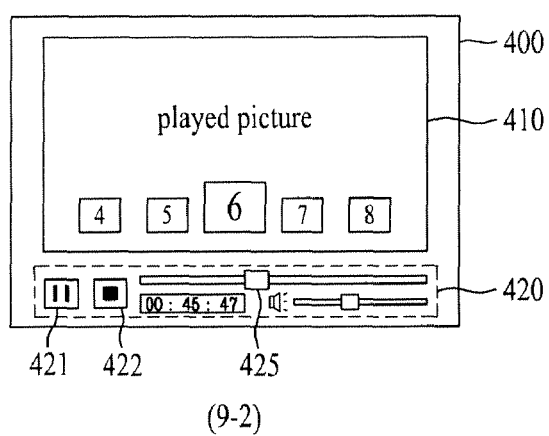

Referring to (9-1) of FIG. 9, a played picture at a current view of a moving picture and a subset KF3 and KF7 of the key frame pictures of the moving picture are displayed on the touchscreen 400.

At least one of the displayed key frame pictures is displayed in a manner of being enlarged larger than the rest of the key frame pictures. In particular, in (9-1) of FIG. 9, the key frame picture KF5 located in the middle of the displayed key frame pictures is displayed by being enlarged. As depicted in (9-1), one of the displayed key frame pictures is touched and dragged.

Referring to (9-2) of FIG. 9, the key frame pictures slide and move. This mechanism is explained in the foregoing description and its details will be omitted in the following description for clarity of this disclosure. Even if the key frame pictures slide and move, the key frame picture KF6 located at a middle position is displayed by being enlarged.

Figure 10:
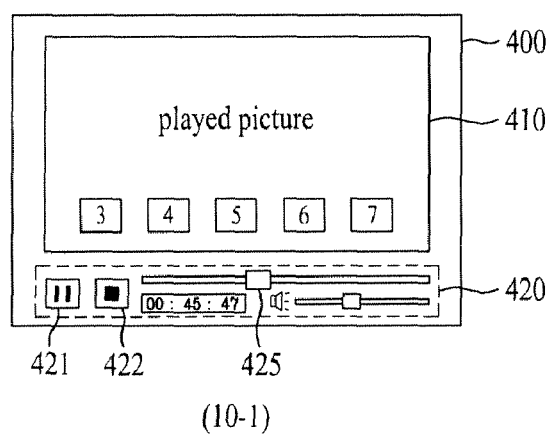
Figure 10:
Figure 10:
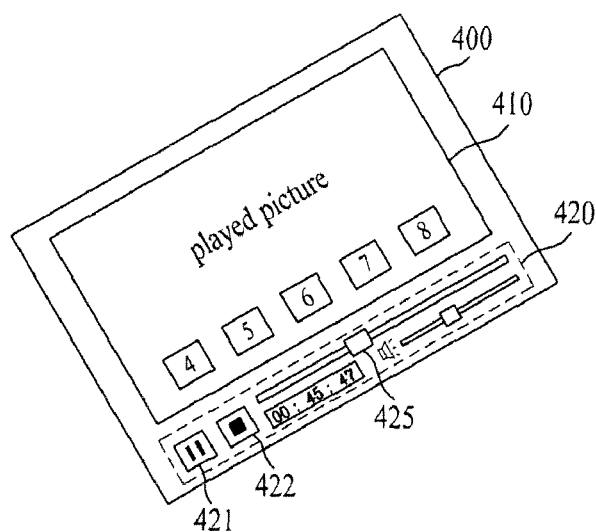

Referring to (10-1) of FIG. 10, a played picture at a current view of a moving picture and a subset KF3 and KF7 of the key frame pictures of the moving picture are displayed on the touchscreen 400.

Referring to (10-2) of FIG. 10, when the mobile terminal 100 is slanted (tilted or rotated) to the left for example, a left side of the touchscreen 400 is set lower than the right side.

The sensing unit 140 detects the slant of the mobile terminal 400. Subsequently, the controller 180 controls the key frame pictures to slide to the left on the touchscreen 400. If the mobile terminal 100 is slanted to the right, the key frame pictures can slide to the right as well. Therefore, a terminal user is able to move the key frame pictures by simply slanting the mobile terminal 100 instead of performing touch and drag on the touchscreen 400.

Figure 11:
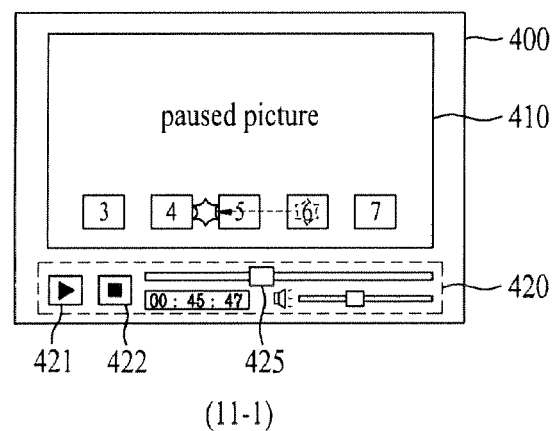
Figure 11:
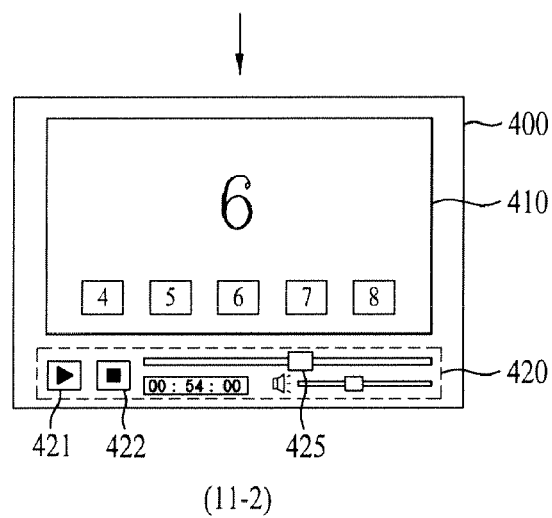

Referring to (11-1) of FIG. 11, a paused still picture of a moving picture and a subset KF3 to KF7 of key frame pictures of the moving picture are displayed on the touchscreen 400. As mentioned in the foregoing description, the pause of the moving picture can be achieved via the icon 421 provided in the control area. As depicted in (11-1), a prescribed key frame picture KF6 among the displayed key frame pictures is touched and dragged right to left.

Referring to (11-2) of FIG. 11, the key frame pictures are moved by sliding right to left. One of the moved and displayed key frame pictures KF4 to KF8, that is, the key frame picture KF6, is displayed on the played picture area 410. In (11-2) of FIG. 11, the middle-located key frame picture KF6 among the moved and displayed key frame pictures KF4 to KF8 is displayed on the played picture area 410. However, the mobile terminal can configure other key frame pictures to be displayed on the played picture area 410.

Figure 12:
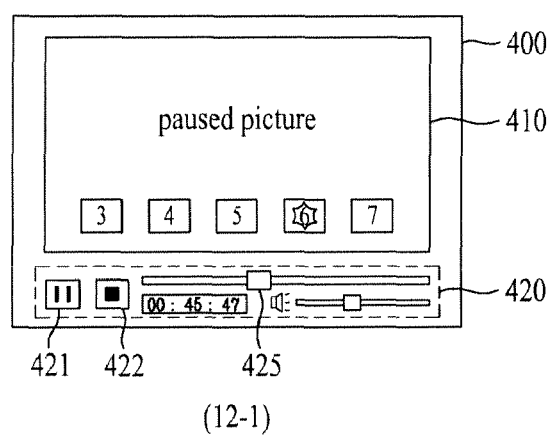
Figure 12:
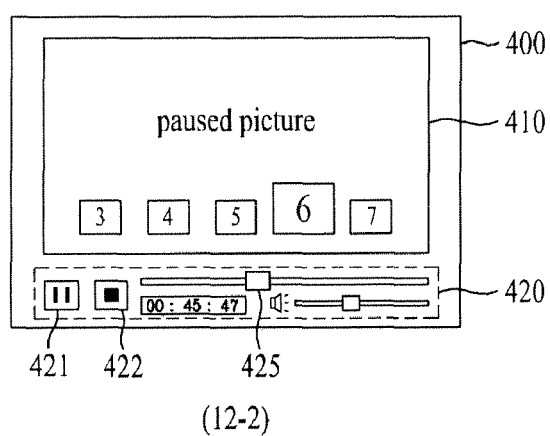

Referring to (12-1) of FIG. 12, a played picture at a current view of a moving picture and a subset KF3 and KF7 of the key frame pictures of the moving picture are displayed on the touchscreen 400. As depicted in (12-1), a proximity touch is performed on a prescribed one KF6 of the displayed key frame pictures.

Referring to (12-2) of FIG. 12, the proximity-touched key frame picture is displayed in a manner of being enlarged bigger than the rest of the key frame pictures. Therefore, a terminal user is facilitated in checking the prescribed key frame picture through enlarging the prescribed key frame picture by the proximity touch.

When the key frame picture which had been proximity-touched is contact-touched, the contact-touched key frame picture will be displayed in the played picture area 410 in the touch screen 400.

In the above description of the first embodiment of the present invention, prescribed key frame pictures are displayed on the touchscreen in a manner that the terminal user shifts the key frame pictures according to necessity.

According to a second embodiment of the present invention described below, a different key frame picture which can be set by a terminal user can be added to key frame pictures in advance according to necessity or replaces the preset key frame pictures by a different key frame picture.

In the following description, a method of controlling a mobile terminal according to a second embodiment of the present invention is explained with reference to FIGS. 13 to 26.

Figure 13:
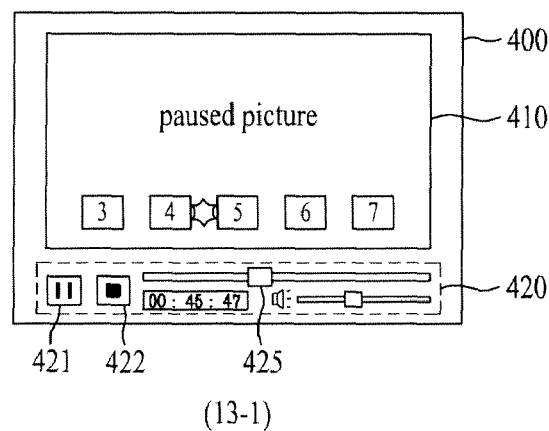
FIG. 13 is a diagram of a display screen on which a method of controlling a mobile terminal according to a second embodiment of the present invention is implemented.
Figure 13:
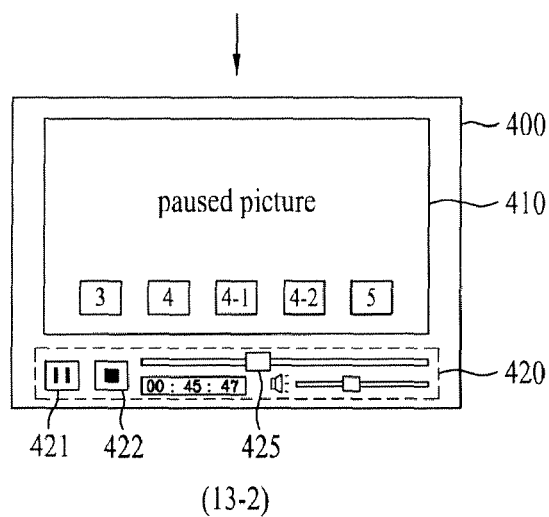
Figure 14:
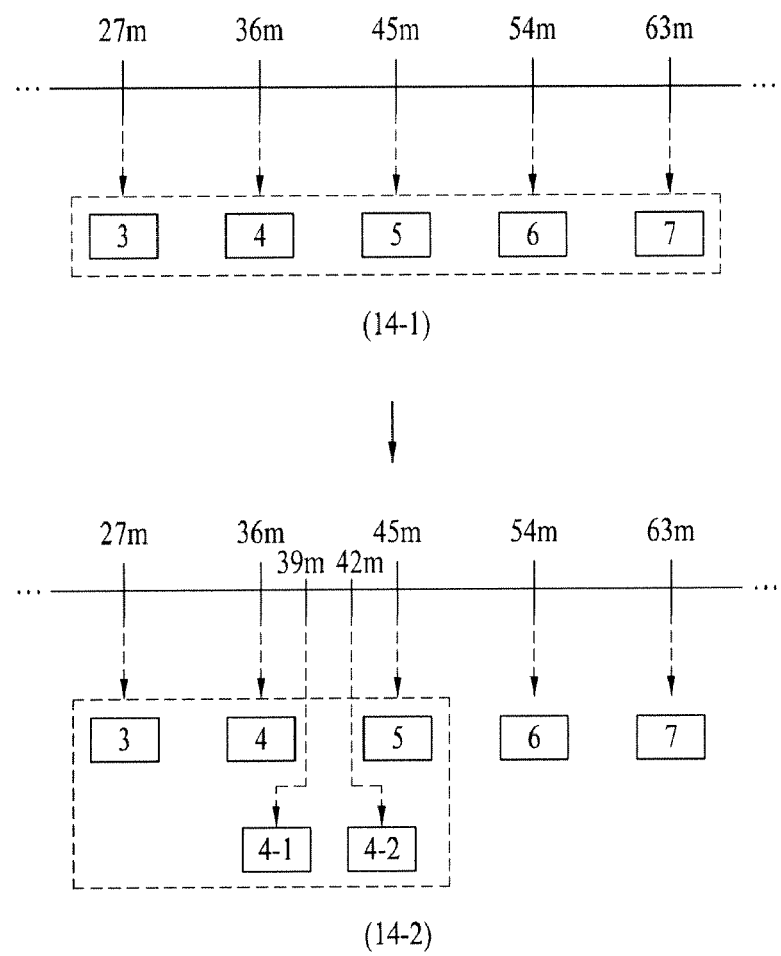
FIG. 14 is a configurational diagram of a key frame for a moving picture described in FIG. 13.

FIG. 13 is a diagram of a display screen on which a method of controlling a mobile terminal according to a second embodiment of the present invention is implemented, and FIG. 14 is a configurational diagram of a key frame for a moving picture described in FIG. 13.

Referring to (13-1) of FIG. 13, a played picture at a current view of a moving picture and a subset KF3 and KF7 of the key frame pictures of the moving picture are displayed on the touchscreen 400. As depicted in (13-1), a space between two adjacent key frame pictures KF4 and KF5 among the displayed key frame pictures is touched.

Referring to (13-2) of FIG. 13, a prescribed number of sub-key frame pictures KF4-1 and KF4-2 corresponding to the space between the two adjacent key frame pictures are additionally generated. In (13-2) of FIG. 13, two sub-key frame pictures are generated. However, more or less sub-key frame pictures can be generated. Moreover, the prescribed number can be set up by a terminal user in advance. As the two sub-key frame pictures are additionally generated, a subset KF6 and KF7 of the previously displayed key frames are pushed away so as not to be displayed.

In (14-1) of FIG. 14, shown is the configuration of the key frame pictures KF3 to KF7, which are displayed on the touchscreen before the space between the two adjacent key frame pictures is touched. The key frame pictures KF3 to KF7 are equally spaced apart from each other by an equal time interval. A dotted line indicates that the key frame pictures KF3 to KF7 are displayed on the touchscreen.

In (14-2) of FIG. 14, shown is the configuration of the key frame pictures, which are displayed on the touchscreen after the space between the two adjacent key frame pictures has been touched. When the space between the two adjacent key frame pictures KF4 and KF5 is touched, a time interval between the two adjacent key frame pictures KF4 and KF5, as shown in (14-2) of FIG. 14, is equally divided in proportion to a prescribed number and the frame pictures at the equally-divided view become the sub-key frame pictures KF4-1 and KF4-2.

The dotted line indicates that the newly generated sub-key frame pictures KF4-1 and KF4-2 and the key frame pictures KF3 to KF5 neighboring to them are displayed on the touchscreen.

Figure 15:
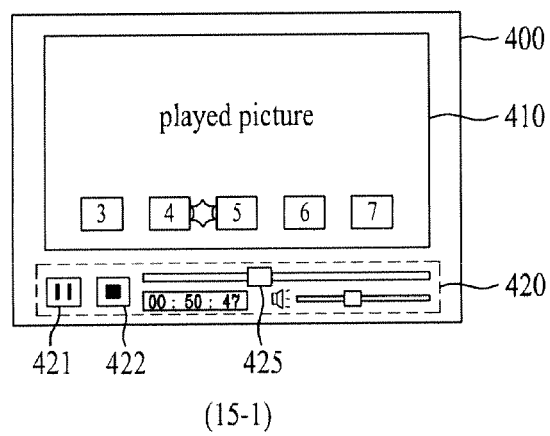
FIG. 15 is a diagram of a display screen on which a method of controlling a mobile terminal according to the second embodiment of the present invention is implemented.
Figure 15:
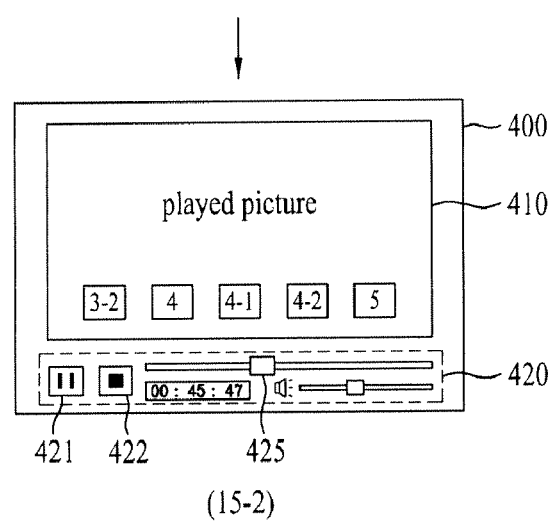
Figure 16:
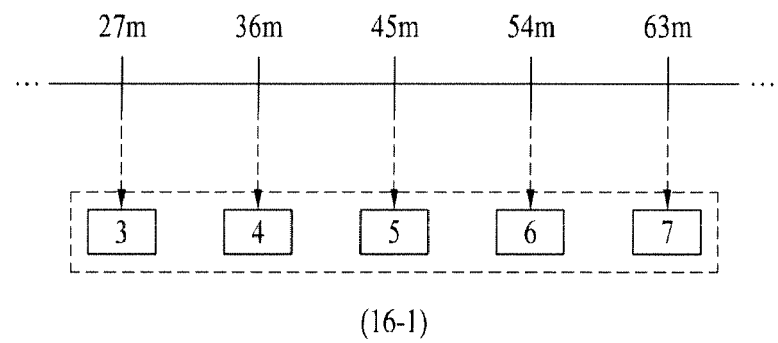
FIG. 16 is a configurational diagram of a key frame for a moving picture described in FIG. 15.
Figure 16:
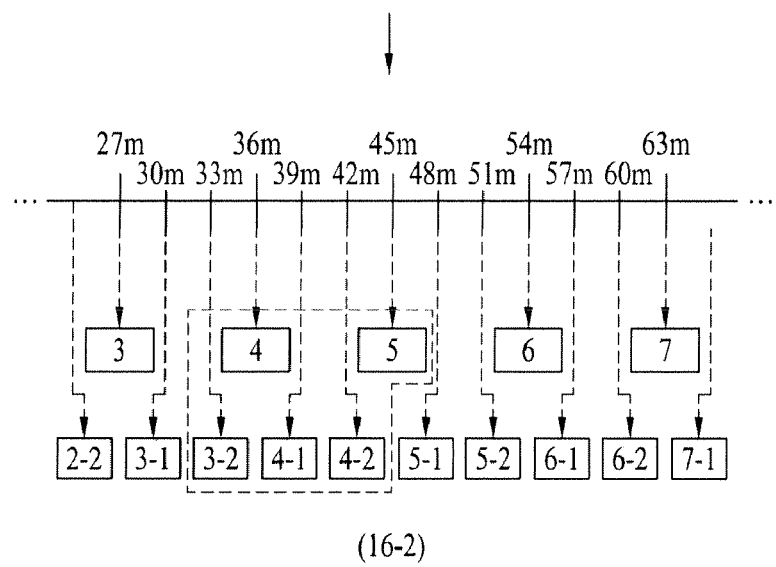

FIG. 15 is a diagram of a display screen on which a method of controlling a mobile terminal according to a second embodiment of the present invention is implemented, and FIG. 16 is a configurational diagram of a key frame for a moving picture described in FIG. 15.

Referring to (15-1) of FIG. 15, a played picture of a current view of a moving picture and a subset KF3 and KF7 at the key frame pictures of the moving picture are displayed on the touchscreen 400. As depicted in (15-1), a space between two adjacent key frame pictures KF4 and KF5 among the displayed key frame pictures is touched.

Referring to (15-2) of FIG. 15, a prescribed number of sub-key frame pictures KF4-1 and KF4-2 corresponding to the space between the two adjacent key frame pictures are additionally generated. In addition, sub-key frame pictures KF3-2 and other non-displayed sub-key frame pictures are also generated between the remaining key frame pictures. In (15-2) of FIG. 15, two sub-key frame pictures are generated between every two key frame pictures. However, more or less sub-key frame pictures can be generated. Moreover, the prescribed number can be set up by a terminal user in advance. As the sub-key frame pictures KF3-2, KF4-1, and KF4-2 are additionally generated, KF3, KF6, and KF7 of the previously displayed key frames are pushed away so as not to be displayed.

In (16-1) of FIG. 16, shown is the configuration of the key frame pictures KF3 to KF7, which are displayed on the touchscreen before the space between the two adjacent key frame pictures is touched. The key frame pictures KF3 to KF7 are equally spaced apart from each other by an equal time interval. A dotted line indicates that the key frame pictures KF3 to KF7 are displayed on the touchscreen.

In (16-2) of FIG. 16, shown is the configuration of the key frame pictures, which are displayed on the touchscreen after the space between the two adjacent key frame pictures has been touched. When the space between the two adjacent key frame pictures KF4 and KF5 is touched, each time interval between every two of the key frame pictures KF1 to KF9, as shown in (16-2) of FIG. 16, is equally divided in proportion to a prescribed number and the frame pictures at the equally-divided views become the sub-key frame pictures KF1-1, KF1-2, . . . , KF9-2.

The dotted line indicates that KF3-2, KF4-1, and KF4-2 of the newly generated sub-key frame pictures and the two adjacent key frame pictures KF4 and KF5 are displayed on the touchscreen.

The non-displayed sub-key frame pictures among the sub-key frame pictures can be displayed on the touchscreen when the key frame pictures are shifted. The shift or migration of the key frame pictures is explained in the foregoing description and its details will be omitted in the following description for clarity of this disclosure.

Figure 17:
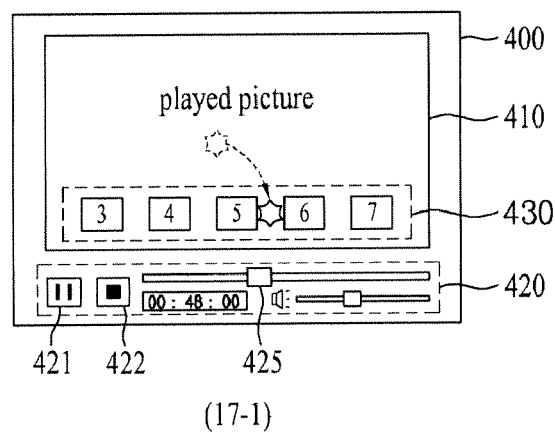
FIG. 17 is a diagram of a display screen on which a method of controlling a mobile terminal according to the second embodiment of the present invention is implemented.
Figure 17:
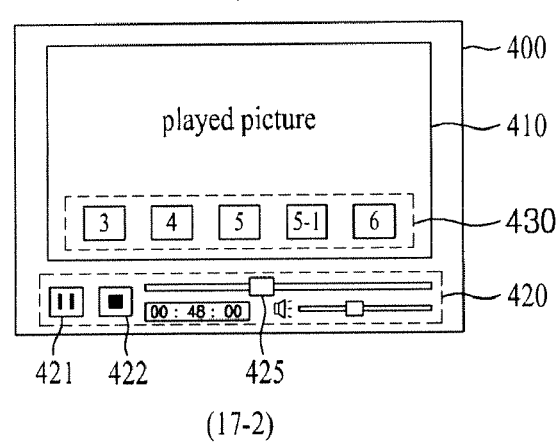
Figure 18:
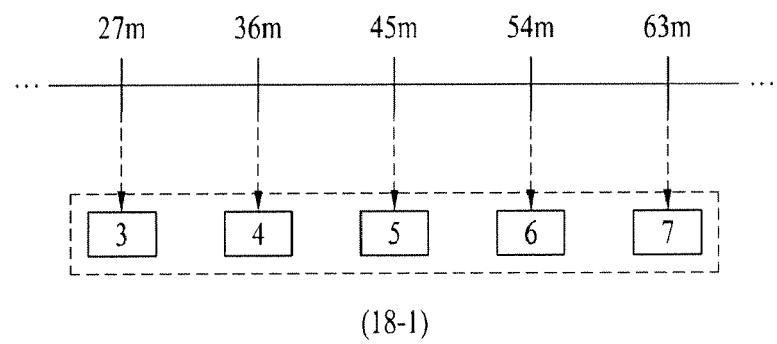
FIG. 18 is a configurational diagram of a key frame for a moving picture described in FIG. 17.
Figure 18:
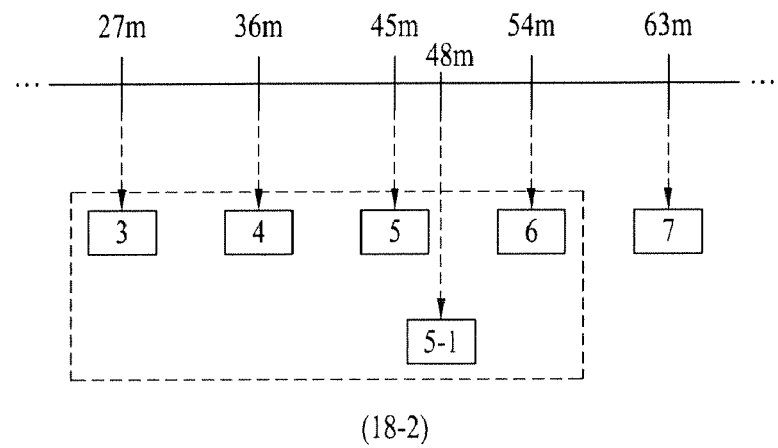

FIG. 17 is another diagram of a display screen on which a method of controlling a mobile terminal according to a second embodiment of the present invention is implemented, and FIG. 18 is a configurational diagram of a key frame for a moving picture described in FIG. 17.

Referring to (17-1) of FIG. 17, a played picture at a current view of a moving picture and a subset KF3 and KF7 of the key frame pictures of the moving picture are displayed on the touchscreen 400. As depicted in (17-1), the played picture area 410 is touched and dragged to the key frame picture area 430.

Referring to (17-2) of FIG. 17, a frame picture of the moving picture at the touched view becomes a key frame picture KF5-1 and is then displayed on the key frame picture area 430. The mobile terminal is able to configure a position of the newly generated key frame picture to be appropriately placed between the previous key frame pictures by considering the corresponding play view and the play views of the previous key frame pictures. As the key frame picture is newly generated, KF7 of the previously displayed key frame pictures is pushed so as not to be displayed.

FIG. 18 is further explained for FIG. 17 as follows. In (18-1) of FIG. 18, shown is the configuration of the key frame pictures KF3 to KF7, which are displayed on the touchscreen before the played picture area 410 is touched and dragged to the key frame picture area 430. The key frame pictures KF3 to KF7 are equally spaced apart from each other by an equal time interval. A dotted line indicates that the key frame pictures KF3 to KF7 are displayed on the touchscreen.

In (18-2) of FIG. 18, shown is the configuration of the key frame pictures, which are displayed on the touchscreen after the played picture area 410 has been touched and dragged to the key frame picture area 430. In particular, the frame picture of the moving picture at the touched view becomes a key frame picture KF5-1. A position of the newly generated key frame picture is appropriately placed between the previous key frame pictures by considering the corresponding play view and the play views of the previous key frame pictures. The dotted line indicates that the newly generated sub-key frame picture KF5-1 and a subset KF3 to KF6 of the previous key frame pictures are displayed on the touchscreen.

Figure 19:
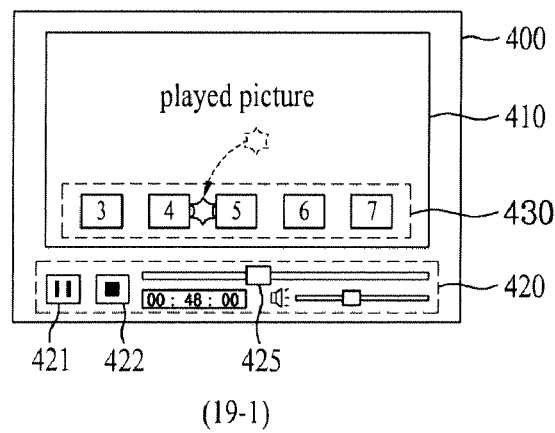
FIG. 19 is a diagram of a display screen on which a method of controlling a mobile terminal according to the second embodiment of the present invention is implemented.
Figure 19:
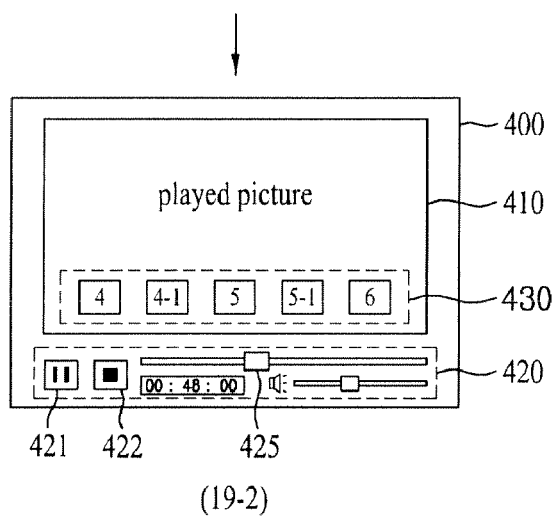
Figure 20:
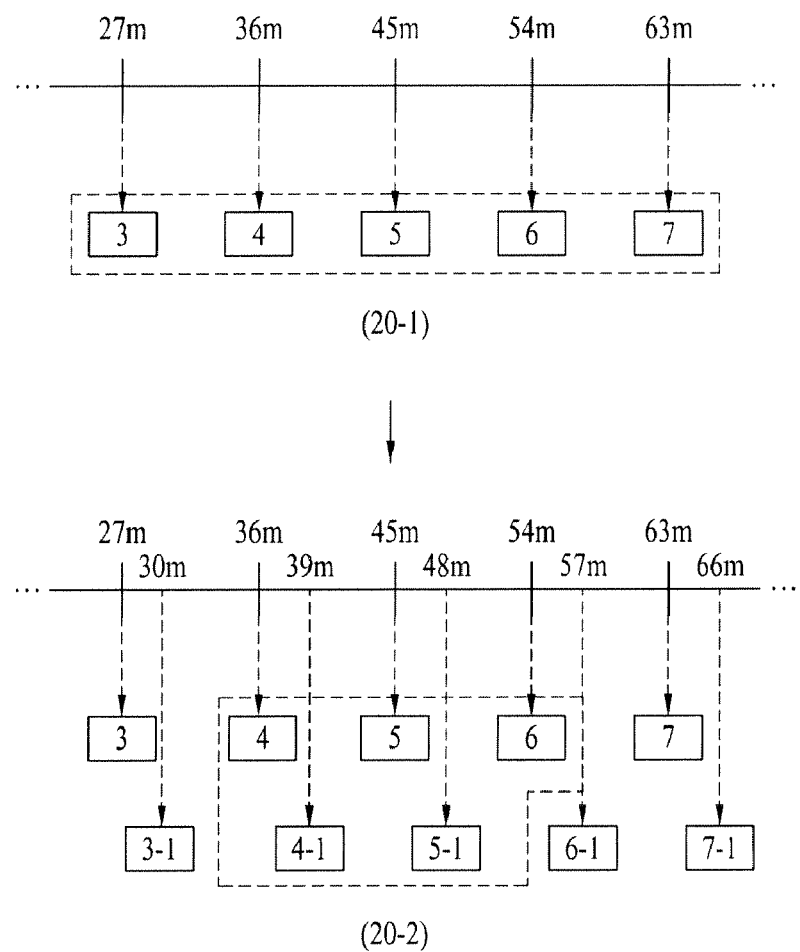
FIG. 20 is a configurational diagram of a key frame for a moving picture described in FIG. 19.

FIG. 19 is a diagram of a display screen on which a method of controlling a mobile terminal according to the second embodiment of the present invention is implemented, and FIG. 20 is a configurational diagram of a key frame for a moving picture described in FIG. 19.

Referring to (19-1) of FIG. 19, a played picture at a current view of a moving picture and a subset KF3 and KF7 of the key frame pictures of the moving picture are displayed on the touchscreen 400. As depicted in (19-1), the played picture area 410 is touched and dragged to the key frame picture area 430.

Referring to (19-2) of FIG. 19, a frame picture of the moving picture at the touched view becomes a key frame picture KF5-1 and is then displayed on the key frame picture area 430. The mobile terminal 100 is able to configure a position of the newly generated key frame picture to be appropriately placed between the previous key frame pictures by considering the corresponding play view and the play views of the previous key frame pictures. Besides the newly generated key frame picture KF5-1, key frame pictures KF1-1, . . . , KF4-1, KF6-1, . . . , KF9-1 are newly generated between the entire previous key frame pictures. As the key frame pictures are newly generated, KF3 and KF7 of the previously displayed key frame pictures are pushed so as not to be displayed.

FIG. 20 is further explained for FIG. 19 as follows. In (20-1) of FIG. 20, shown is the configuration of the key frame pictures KF3 to KF7, which are displayed on the touchscreen before the played picture area 410 is touched and dragged to the key frame picture area 430. The key frame pictures KF3 to KF7 are equally spaced apart from each other by an equal time interval. A dotted line indicates that the key frame pictures KF3 to KF7 are displayed on the touchscreen.

In (20-2) of FIG. 20, shown is the configuration of the key frame pictures, which are displayed on the touchscreen after the played picture area 410 has been touched and dragged to the key frame picture area 430. In particular, the key frame pictures . . . KF3-1, KF4-1, KF6-1, KF7-1 . . . are newly generated between the entire previous key frame pictures.

A time interval between each of the newly generated key frame pictures and the previous key frame right before the corresponding picture is maintained as the time interval between the key frame picture KF5-1 at the touched view and the previous key frame picture KF5 right before the corresponding picture.

The dotted line indicates that KF4-1 and KF5-1 of the newly generated sub-key frame pictures and KF4 to KF6 of the previous key frame pictures are displayed on the touchscreen.

Figure 21:
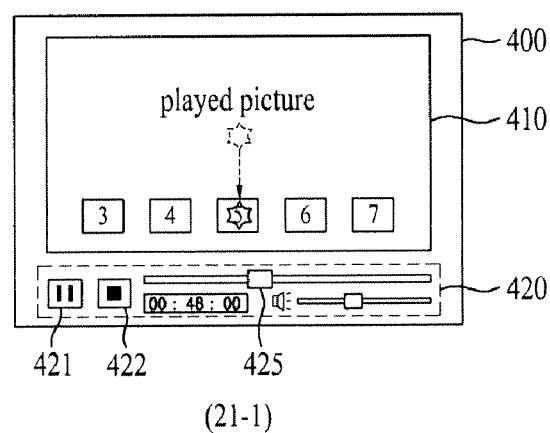
FIG. 21 is a diagram of a display screen on which a method of controlling a mobile terminal according to the second embodiment of the present invention is implemented.
Figure 21:
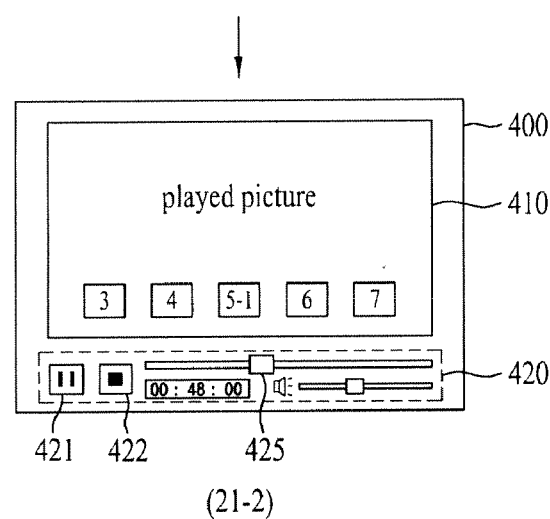
Figure 22:
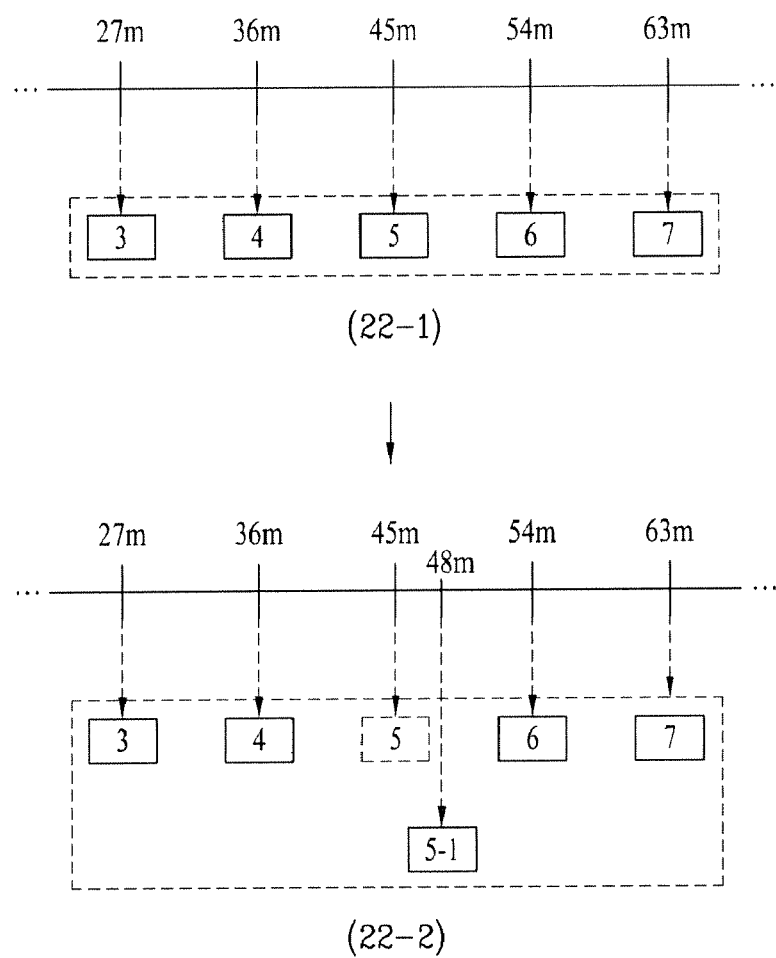
FIG. 22 is a configurational diagram of a key frame for a moving picture described in FIG. 21.

FIG. 21 is a diagram of a display screen on which a method of controlling a mobile terminal according to a second embodiment of the present invention is implemented, and FIG. 22 is a configurational diagram of a key frame for a moving picture described in FIG. 21.

Referring to (21-1) of FIG. 21, a played picture at a current view of a moving picture and a subset KF3 and KF7 of the key frame pictures of the moving picture are displayed on the touchscreen 400. As depicted in (21-1), the played picture area 410 is touched and dragged to one of the key frame pictures randomly.

Referring to (21-2) of FIG. 21, the frame picture at the touched view becomes the key frame picture KF5-1. The key frame picture KF5-1 replaces the previous key frame picture KF5 closest to itself on a time basis.

FIG. 22 is further explained for FIG. 21. In (22-1) of FIG. 22, shown is the configuration of the key frame pictures KF3 to KF7, which are displayed on the touchscreen before the played picture area 410 is touched and dragged to a random one of the key frame pictures. The key frame pictures KF3 to KF7 are equally spaced apart from each other by an equal time interval. A dotted line indicates that the key frame pictures KF3 to KF7 are displayed on the touchscreen.

In (22-2) of FIG. 22, shown is the configuration of the key frame pictures, which are displayed on the touchscreen after the played picture area 410 has been touched and dragged to a random one of the key frame pictures. As mentioned in the foregoing description, the frame picture of the moving picture at the touched view becomes the key frame picture KF5-1 and the key frame KF5-1 replaces the previous key frame picture closest to itself on the time basis. The dotted line indicates that the newly generated key frame picture KF5-1 and KF3, KF4, KF6, and KF7 of the previous key frame pictures are displayed on the touchscreen 400.

Figure 23:
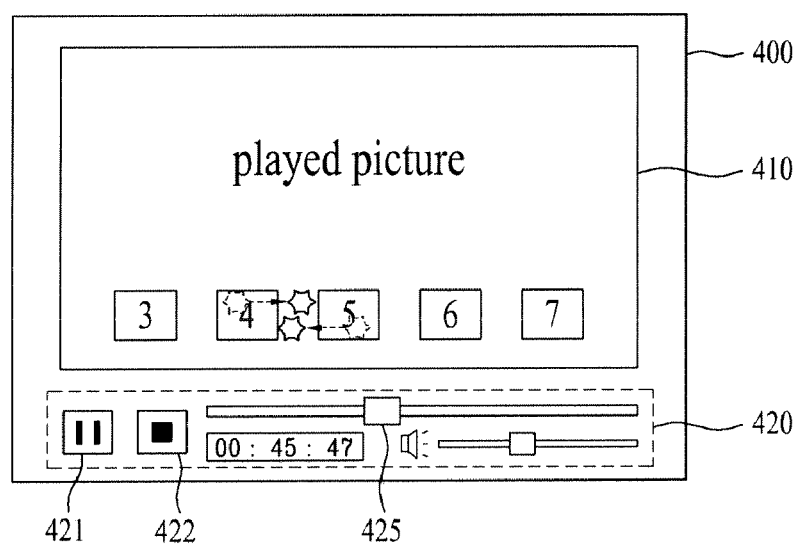
FIG. 23 is a diagram of a display screen on which a method of controlling a mobile terminal according to the second embodiment of the present invention is implemented.
Figure 23:
Figure 23:
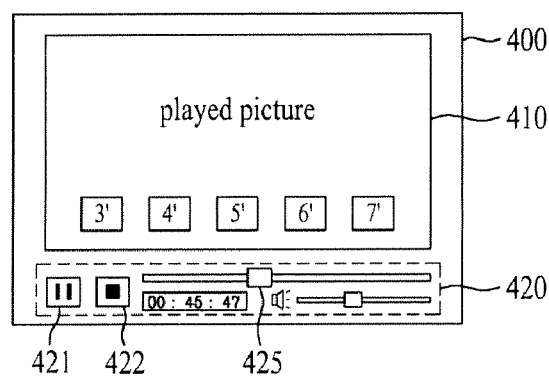
Figure 24:
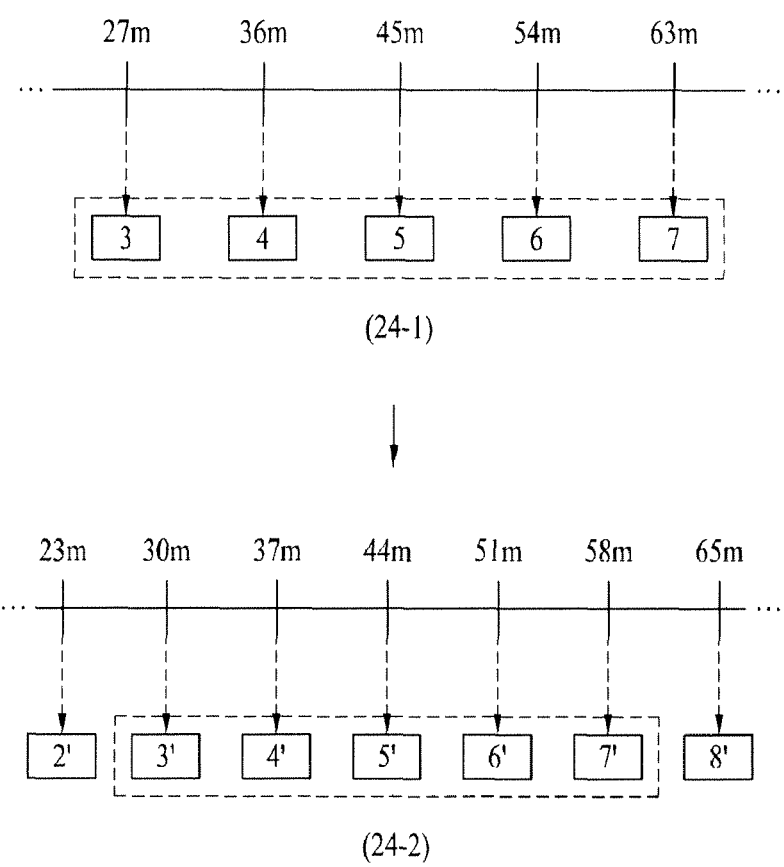
FIG. 24 is a configurational diagram of a key frame for a moving picture described in FIG. 23.

FIG. 23 is a diagram of a display screen on which a method of controlling a mobile terminal according to the second embodiment of the present invention is implemented, and FIG. 24 is a configurational diagram of a key frame for a moving picture described in FIG. 23.

Referring to (23-1) of FIG. 23, a played picture at a current view of a moving picture and a subset KF3 and KF7 of the key frame pictures of the moving picture are displayed on the touchscreen 400. As depicted in (23-1), two KF4 and KF5 of the key frame pictures are simultaneously touched and dragged toward each other.

Referring to (23-2) of FIG. 23, the key frame pictures are adjusted such that a time interval between the key frame pictures is readjusted to get narrower. In particular, the previous key frame pictures KF1 to KF9 spaced apart from each other by a first time interval are transformed into new key frame pictures KF1' to KF9' spaced apart from each other by a second time interval. In this case, the second time interval is narrower than the first time interval.

FIG. 24 is further explained for FIG. 23. In (24-1) of FIG. 24, shown is the configuration of the key frame pictures KF3 to KF7, which are displayed on the touchscreen before the key frame pictures KF4 and KF5 are touched and dragged toward each other. The key frame pictures KF3 to KF7 are spaced apart from each other by the first time interval. The dotted line indicates that the key frame pictures KF3 to KF7 are displayed on the touchscreen.

In (24-2) of FIG. 24, shown is the configuration of the key frame pictures KF2' to KF8' . . . , which are readjusted after the key frame pictures KF4 and KF5 have been touched and dragged toward each other. The readjusted key frame pictures . . . KF2' to KF8' . . . are spaced apart from each other by the second time interval narrower than the first time interval. The dotted line indicates that KF3' to KF7' of the readjusted key frame pictures KF1' to KF9' are displayed on the touchscreen 400.

Figure 25:
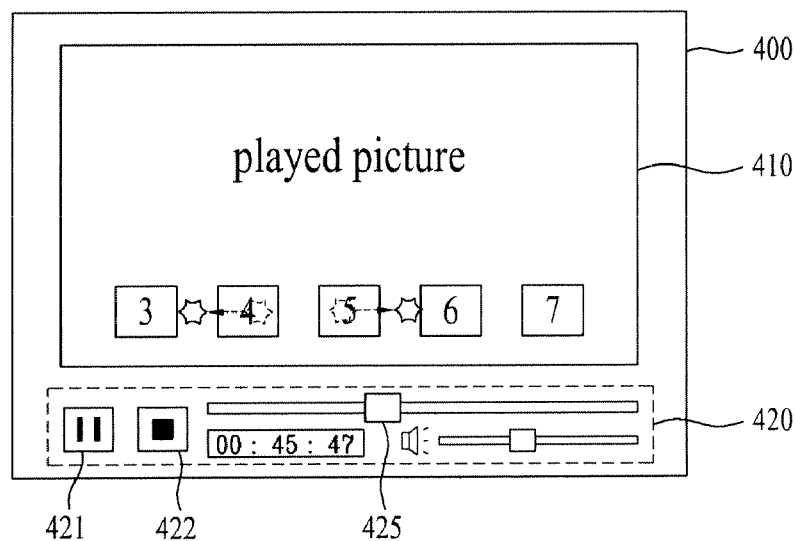
FIG. 25 is a diagram of a display screen on which a method of controlling a mobile terminal according to the second embodiment of the present invention is implemented.
Figure 25:
Figure 25:
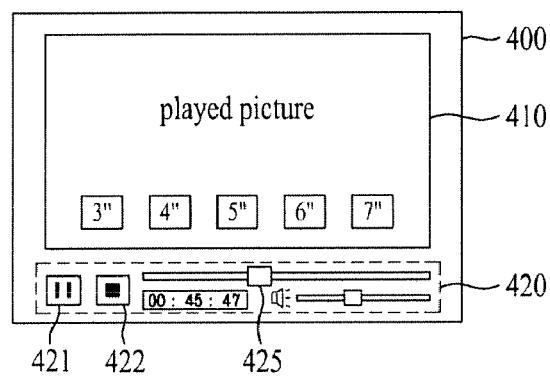
Figure 26:
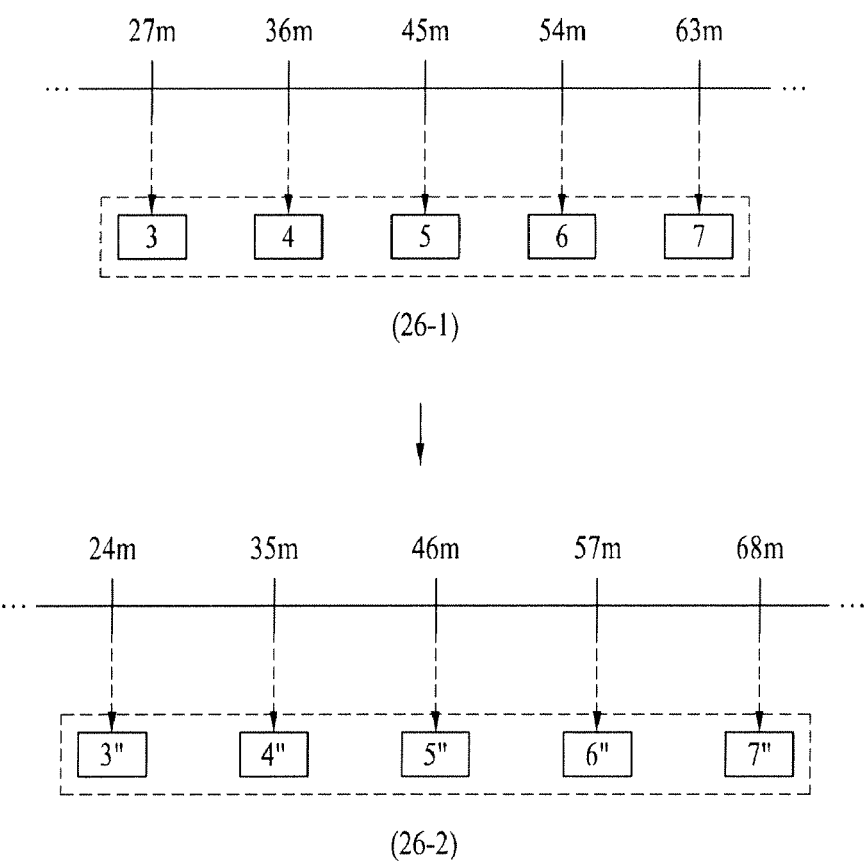
FIG. 26 is a configurational diagram of a key frame for a moving picture described in FIG. 25.

FIG. 25 is a diagram of a display screen on which a method of controlling a mobile terminal according to the second embodiment of the present invention is implemented, and FIG. 26 is a configurational diagram of a key frame for a moving picture described in FIG. 25.

Referring to (25-1) of FIG. 25, a played picture at a current view of a moving picture and KF3 and KF7 of the key frame pictures of the moving picture are displayed on the touchscreen 400. As depicted in (25-1), two KF4 and KF5 of the key frame pictures are simultaneously touched and dragged in a direction getting farther from each other.

Referring to (25-2) of FIG. 25, the key frame pictures are adjusted in a manner that a time interval between the key frame pictures is readjusted to get wider. In particular, the previous key frame pictures . . . KF3, KF4, KF5, KF6, KF7 . . . spaced apart from each other by a first time interval are transformed into new key frame pictures . . . KF3", KF4", KF5", KF6", KF7" . . . spaced apart from each other by a third time interval. In this case, the third time interval is wider than the first time interval.

FIG. 25 is further explained for FIG. 24. In (26-1) of FIG. 26, shown is the configuration of the key frame pictures KF3 to KF7, which are displayed on the touchscreen before the key frame pictures KF4 and KF5 are touched and dragged in the direction getting farther from each other. The key frame pictures KF3 to KF7 are spaced apart from each other by the first time interval. The dotted line indicates that the key frame pictures KF3 to KF7 are displayed on the touchscreen.

In (26-2) of FIG. 26, shown is the configuration of the key frame pictures . . . KF3" to KF7" . . . , which are readjusted after the key frame pictures KF4 and KF5 have been touched and dragged in the direction getting farther from each other. The readjusted key frame pictures . . . KF3" to KF7" . . . are spaced apart from each other by the third time interval wider than the first time interval. The dotted line indicates that some KF3" to KF7" of the readjusted key frame pictures are displayed on the touchscreen 400.

Figure 27:
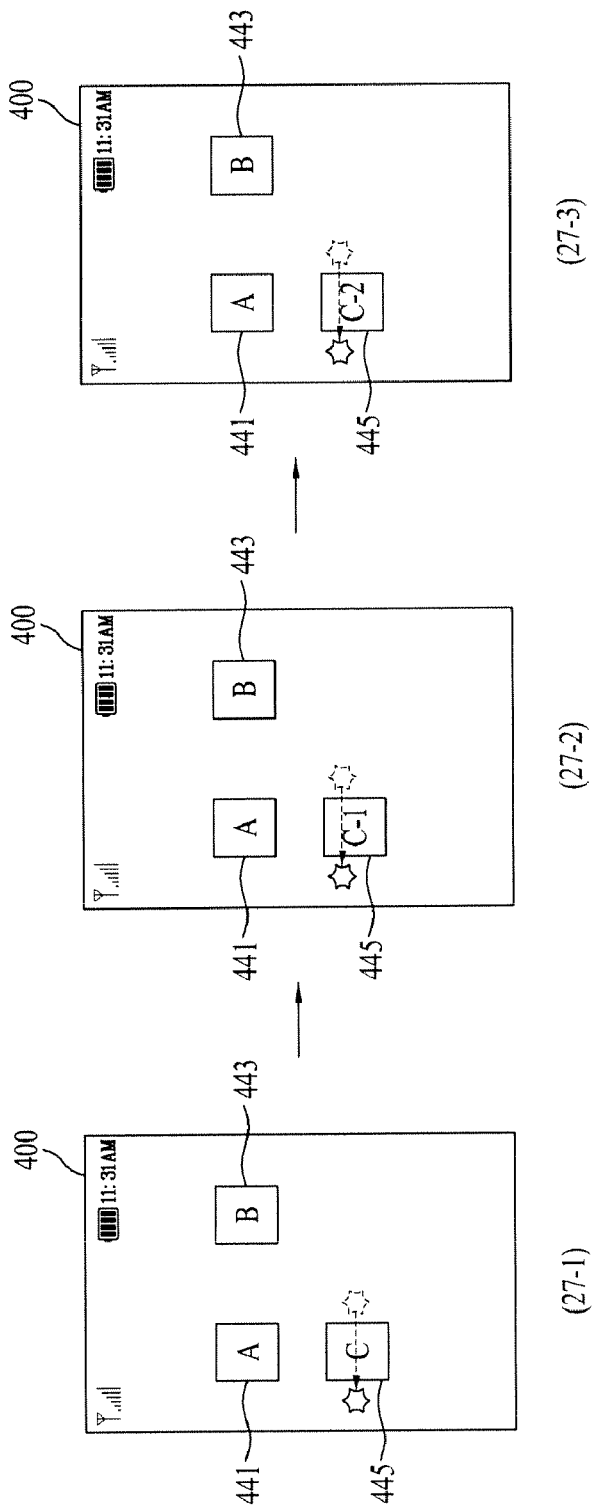
FIG. 27 is a diagram of a display screen on which a method of controlling a mobile terminal according to a third embodiment of the present invention is implemented.

In the following description, a method of controlling a mobile terminal according to a third embodiment of the present invention is explained with reference to FIG. 27. FIG. 27 is a diagram of a display screen on which a method of controlling a mobile terminal according to the third embodiment of the present invention is implemented.

Referring to (27-1) of FIG. 27, moving picture thumbnails (or icons) 441, 443 and 445 are displayed on the touchscreen 400. As depicted, a specific one 445 of the moving picture thumbnails is touched (proximity touch or contact touch) and dragged (or flicked) in one direction. Alternatively, a touch is performed on a vicinity of the specific thumbnail 445 and a drag is then performed across the specific thumbnail 445.

Referring to (27-2) and (27-3) of FIG. 27, each time the specific thumbnail 445 is touched and dragged, a picture of the specific thumbnail 445 is transformed into one of key frame pictures of a moving picture of the specific thumbnail 445.

Therefore, a terminal is facilitated to recognize the content of the moving picture without playing back the corresponding moving picture.

Accordingly, the disclosed embodiments provide, among other benefits, the following effects and/or advantages: (1) first, according to at least one of the embodiments of the present disclosure, a terminal user is facilitated in searching for a specific part of a moving picture while viewing the moving picture in a terminal; and (2) second, according to at least one of embodiments of the present disclosure, a terminal user is facilitated in checking the content of a moving picture through thumbnails of the moving picture without playing back the corresponding moving picture.

What is claimed is:

1. A mobile terminal configured to:
play a moving picture on a first area of a touchscreen,
display, in response to a first input on the touchscreen, a plurality of first key frame pictures on a second area of the touchscreen, and
display, in response to a second input on the touchscreen, a plurality of second key frame pictures between two of the first key frame pictures,
wherein at least one of the first key frame pictures displayed prior to the second input is no longer displayed after the second input.

2. The mobile terminal of claim 1, wherein the at least one of the first key frame pictures prior to the second input is pushed away to outside of second area and after no longer displayed.

3. The mobile terminal of claim 1, wherein the second area overlaps the first area.

4. The mobile terminal of claim 1, wherein the second area is separate from the first area.

5. The mobile terminal of claim 1, wherein the first input occurs on the first area of the touchscreen.

6. The mobile terminal of claim 1, wherein the second input occurs on the second area of the touchscreen.

7. The mobile terminal of claim 1, wherein, prior to the second input, the key frame pictures are displayed as a one-dimensional array of frame pictures.

8. The mobile terminal of claim 1, wherein, after the second input, the key frame pictures and second key frame pictures are displayed as a one-dimensional array of frame pictures.

9. The mobile terminal of claim 1, wherein the number of second key frame pictures displayed on the second area is predetermined.

10. The mobile terminal of claim 1, wherein, after the second input, at least two second key frame pictures are displayed between two of the key frame pictures, wherein the two key frame pictures were adjacent prior to the second input.

11. The mobile terminal of claim 1, further configured to display a scroll bar.

12. The mobile terminal of claim 11, wherein at least one of the first input and the second input comprises manipulation of the scroll bar via the touchscreen.

13. The mobile terminal of claim 1, further configured to display, on the first area and in response to a third input on the touchscreen, an image associated with a frame of the moving picture.

14. The mobile terminal of claim 1, further configured to display icons on the touchscreen corresponding to one or more of a start, stop, and pause function.

15. A display method for a mobile terminal, the method comprising:
    playing a moving picture on a first area of a touchscreen,
    displaying, in response to a first input on the touchscreen, a plurality of key frame pictures on a second area of the touchscreen, and
    displaying, in response to a second input on the touchscreen, a plurality of second key frame pictures between two of the key frame pictures,
    wherein at least one of the key frame pictures displayed prior to the second input is no longer displayed after the second input.

16. The display method of claim 15, wherein the second area overlaps the first area.

17. The display method of claim 15, wherein the second area is separate from the first area.

18. The display method of claim 15, wherein the first input occurs on the first area of the touchscreen.

19. The display method of claim 15, wherein the second input occurs on the second area of the touchscreen.

20. The display method of claim 15, wherein, prior to the second input, the key frame pictures are displayed as a one-dimensional array of frame pictures.

21. The display method of claim 15, wherein, after the second input, the key frame pictures and second key frame pictures are displayed as a one-dimensional array of frame pictures.

22. The display method of claim 15, wherein the number of second key frame pictures displayed on the second area is predetermined.

23. The display method of claim 15, wherein, after the second input, at least two second key frame pictures are displayed between two of the key frame pictures, wherein the two key frame pictures were adjacent prior to the second input.

24. The display method of claim 15, further comprising displaying a scroll bar.

25. The display method of claim 24, wherein at least one of the first input and the second input comprises manipulation of the scroll bar via the touchscreen.

26. The display method of claim 15, further comprising displaying, on the first area and in response to a third input on the touchscreen, an image associated with a frame of the moving picture.

27. The display method of claim 15, further comprising displaying icons on the touchscreen corresponding to one or more of a start, stop, and pause function.

28. A mobile terminal configured to:
    play a moving picture on a first area of a touchscreen,
    display, in response to a first input on the touchscreen, a plurality of first key frame pictures on a second area of the touchscreen,
    display, in response to a second input on the touchscreen, a plurality of second key frame pictures on the second area of the touchscreen,
    wherein the plurality of second key frame pictures includes at least two second key frame pictures, and
    wherein at least one of the plurality of first key frame pictures is no longer displayed after the second input.

29. A mobile terminal configured to:
    play a moving picture on a first area of a touchscreen,
    display, in response to a first input on the touchscreen, a plurality of first key frame pictures on a second area of the touchscreen, wherein a first time interval separates frames of the moving picture associated with each of the first key frame pictures that are displayed adjacent to one another,
    display, in response to a second input on the touchscreen, a plurality of second key frame pictures on the second area of the touchscreen, wherein a second time interval separates frames of the moving picture associated with each of the second key frame pictures that are displayed adjacent to one another,
    wherein the relative size of the first time interval compared to the second time interval is determined, at least in part, based on the second input.

* * * * *